United States Patent
Utley et al.

(10) Patent No.: US 9,362,535 B2
(45) Date of Patent: Jun. 7, 2016

(54) POUCH-TYPE WRAP FOR BATTERY CELL

(71) Applicant: Ford Global Technologies, LLC, Dearborn, MI (US)

(72) Inventors: Brian Utley, Canton, MI (US); Patrick Daniel Maguire, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 231 days.

(21) Appl. No.: 14/134,233

(22) Filed: Dec. 19, 2013

(65) Prior Publication Data

US 2015/0179990 A1    Jun. 25, 2015

(51) Int. Cl.
| | |
|---|---|
| *H01M 10/647* | (2014.01) |
| *H01M 2/02* | (2006.01) |
| *H01M 2/10* | (2006.01) |
| *H01M 10/653* | (2014.01) |
| *H01M 10/6554* | (2014.01) |
| *H01M 10/613* | (2014.01) |

(52) U.S. Cl.
CPC ............ *H01M 2/024* (2013.01); *H01M 2/0275* (2013.01); *H01M 2/1077* (2013.01); *H01M 10/613* (2015.04); *H01M 10/647* (2015.04); *H01M 10/653* (2015.04); *H01M 10/6554* (2015.04); *Y10T 29/49108* (2015.01)

(58) Field of Classification Search
CPC .............. H01M 2/024; H01M 2/0275; H01M 10/5053; H01M 2/0267; H01M 10/50
USPC .......................................... 429/120, 167, 177
See application file for complete search history.

(56) References Cited

U.S. PATENT DOCUMENTS

| | | | |
|---|---|---|---|
| 5,422,200 A | 6/1995 | Hope et al. | |
| 6,632,538 B1 * | 10/2003 | Yamazaki et al. ............ | 428/461 |
| 8,178,225 B2 | 5/2012 | Ji et al. | |
| 2010/0291428 A1 * | 11/2010 | Graban ............... | H01M 2/1072 429/120 |
| 2011/0229744 A1 * | 9/2011 | Hirota ................. | H01M 2/0404 429/7 |
| 2011/0287295 A1 | 11/2011 | Lappe et al. | |
| 2012/0107663 A1 * | 5/2012 | Burgers et al. ................ | 429/120 |
| 2014/0147737 A1 * | 5/2014 | Anastas et al. ................ | 429/185 |

* cited by examiner

*Primary Examiner* — Kenneth Douyette
*Assistant Examiner* — James Lee
(74) *Attorney, Agent, or Firm* — David B. Kelley; Brooks Kushman P.C.

(57) ABSTRACT

A battery assembly includes a cold plate and a plurality of battery cells arranged in an array. Each of the cells has a bottom in contact with the cold plate and is encased in a dielectric jacket. The dielectric jacket surrounds side portions and the bottom of the cell. The jacket has seams on the side portions of the cells but not on the bottom. The seamless bottom forms a continuous and uninterrupted panel over the bottom to provide a seamless interface between the bottom and cold plate. A method of installing the cell into the jacket is also disclosed.

12 Claims, 5 Drawing Sheets

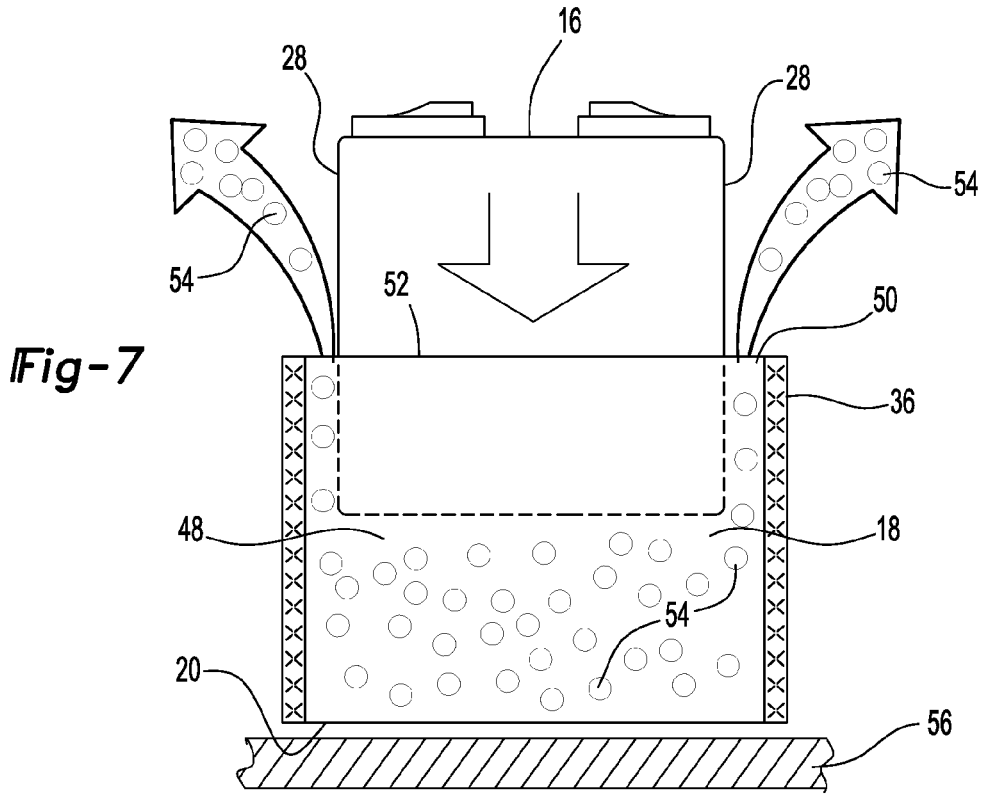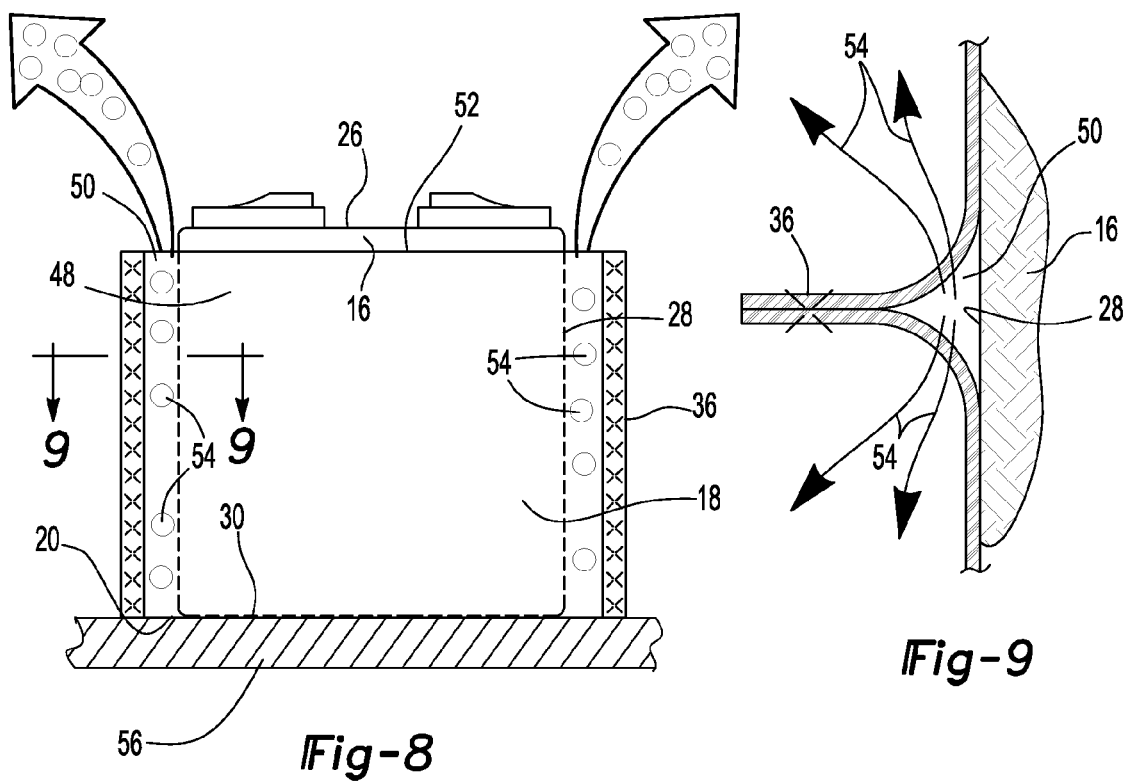

POUCH-TYPE WRAP FOR BATTERY CELL

TECHNICAL FIELD

This disclosure relates to battery cells with a protective jacket for use in an electric vehicle.

BACKGROUND

Vehicles such as battery-electric vehicles (BEVs), plug-in electric vehicles (PHEVs) or hybrid-electric vehicles (HEVs) contain a battery, such as a high voltage battery, to act as an energy source for the vehicle. Battery capacity and cycle life can change depending on the operating temperature of the battery. It is generally desirable to maintain the battery within a specified temperature range while the vehicle is operating or while the vehicle is charging. As such, a vehicle with a high voltage battery may include a cooling system to provide temperature control for the battery to extend battery life and improve battery performance.

Referring to FIG. 1, a prior art battery cell 1 with a jacket 3 is shown. The jacket 3 has a seam 5 along a bottom edge.

SUMMARY

This disclosure provides a battery assembly and method for forming a battery cell protected by a dielectric jacket. The jacket provides a seamless bottom panel and may provide a seamless front and back panel. Seamless panels may increase the transfer of thermal energy and provide for better cell packaging.

In one embodiment, a battery assembly includes a cold plate and a plurality of battery cells supported on the cold plate. Each of the cells is surrounded by a dielectric jacket having a seamless panel disposed between the cold plate and a bottom of the cell such that the seamless panel provides a seamless interface between the cold plate and the bottom of the cell. The seamless panel facilitates heat transfer between the cold plate and the cell.

In another embodiment, a battery assembly includes a plurality of battery cells arranged in an array. Each of the cells has a bottom in contact with a surface and is encased in a dielectric jacket surrounding side portions and the bottom of the cell. Each of the jackets has seams on opposing side portions of a corresponding cell but not on the bottom of the corresponding cell such that the jacket forms a continuous and uninterrupted panel over the bottom to provide a seamless interface between the bottom and the surface.

In yet another embodiment, a method of installing a jacket or pouch on a cell comprises placing a battery cell within a dielectric pouch having opposing side seams and lacking a bottom seam such that the pouch provides a continuous and uninterrupted panel in contact with a bottom of the cell when the cell is in the pouch. The method further comprises disposing the cell bottom against a support with the panel disposed between the bottom and the support to expel air trapped between the bottom and panel from the pouch, and subsequently drawing the pouch to shrink wrap it around the cell.

BRIEF DESCRIPTION OF THE DRAWINGS

FIG. 7 is a front view of a cell being received within a jacket.

FIG. 8 is a front view of the cell of FIG. 7 fully received within the jacket of FIG. 7.

FIG. 9 is a section view along cut 9-9 of FIG. 8.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Electric vehicles may include an energy system having a battery assembly with components such as one or more battery cell arrays, a battery electrical control module (BECM), and a direct current to direct current (DC/DC) converter unit. The battery cell arrays may provide energy to operate the vehicle and its systems. Each battery cell array may include a plurality of battery cells connected in series or parallel. The battery cells, such as a prismatic cell, convert stored chemical energy to electrical energy. The cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another to facilitate a series connection between the multiple battery cells.

Figure 1:
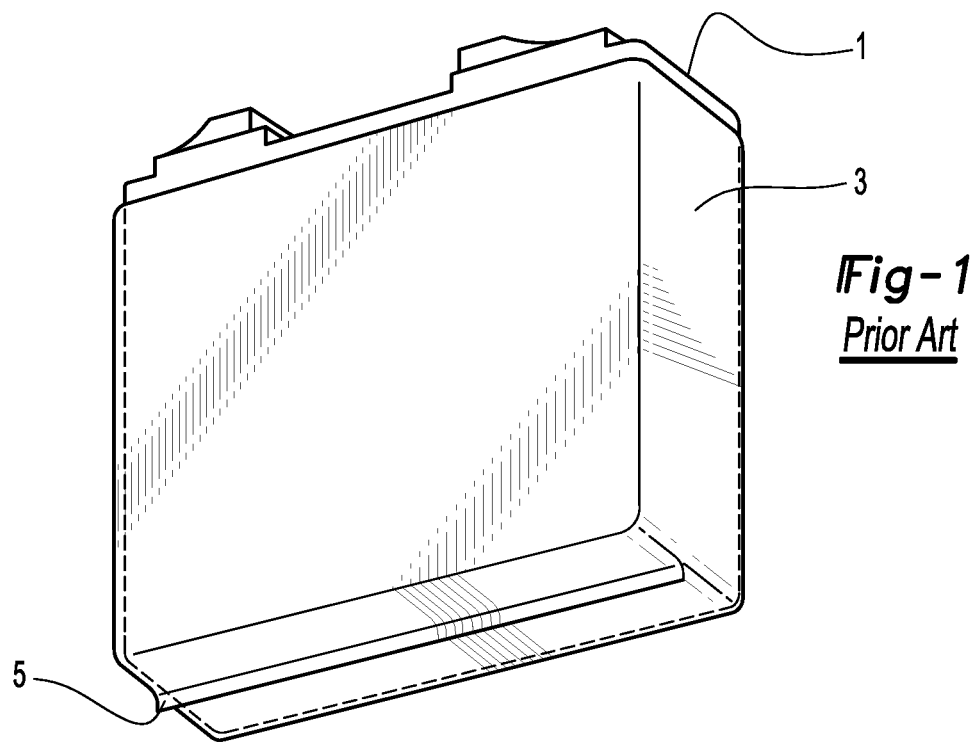
FIG. 1 is a perspective view of a prior art battery cell and jacket.
Figure 2:
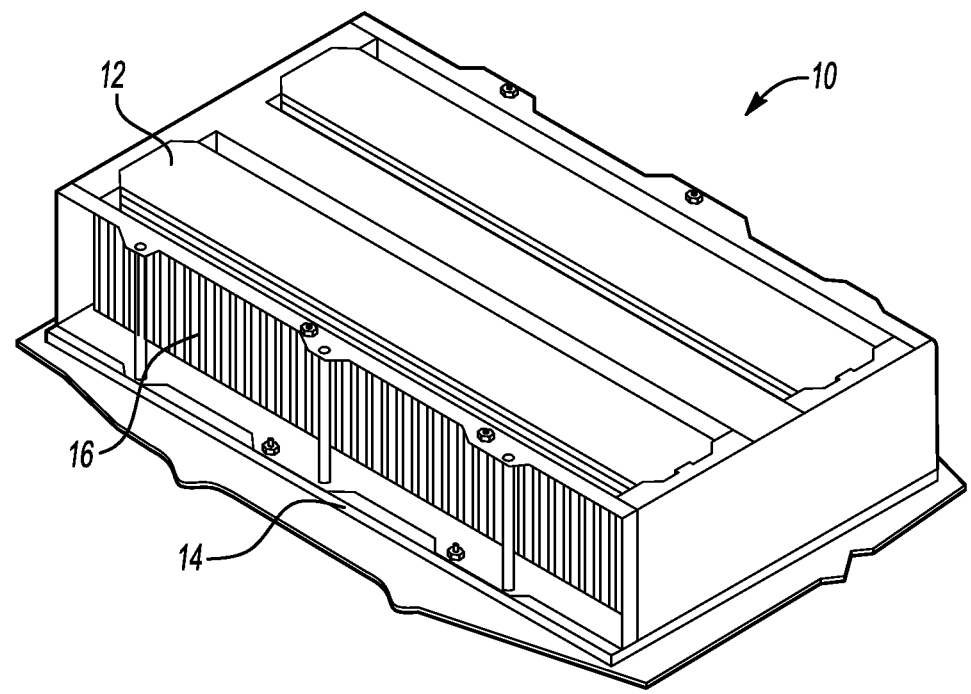
FIG. 2 is a prospective view of a battery assembly.

Referring to FIG. 2, a battery assembly 10 is depicted. The battery assembly 10 may include a thermal management system to control the temperature of the battery array 12. The thermal management of the battery array 12 may be accomplished by a variety of systems such as air or liquid cooled systems. FIG. 2 illustrates a liquid cooled system that includes a cold plate 14 having one or more pipes, or water jackets disposed within the cold plate and a coolant circulating through the pipes to remove unwanted heat from the battery array 12. The individual cells 16 of the battery array 12 may be disposed directly on the cold plate 14 along the cell bottom edge. Unwanted heat from each cell 16 is exchanged across the cold plate 14 to maintain the cells 16 and battery array 12 within a desired temperature range. In the alternative, the cold plate may be used to provide heat to the cells depending on the design and desired effect. For example, it may be desirable to heat the cells in the winter.

The battery cells 16 may be at least partially electrically conductive across the entire surface of the cell and not just at the terminals. Accordingly, the battery cell outer surface may need to be electrically insulated on areas having contact with other objects to prevent unwanted electric discharge. The battery cell 16 is insulated by a dielectric jacket or wrapping. Various types of cell jackets have been employed including seamless plastic tubes, dielectric tape, or sealed seamless plastic tubes. While these types of jackets provide electrical insulation, they do not provide a seamless, flat panel over the bottom of the cell.

Providing a uniform and continuous interface between the bottom of the cell and the cold plate may increase the transfer of thermal energy across the cell-cold plate interface. The present disclosure proposes such an interface by providing a battery cell with a seamless jacket along the cell bottom in contact with the cold plate.

Figure 3:
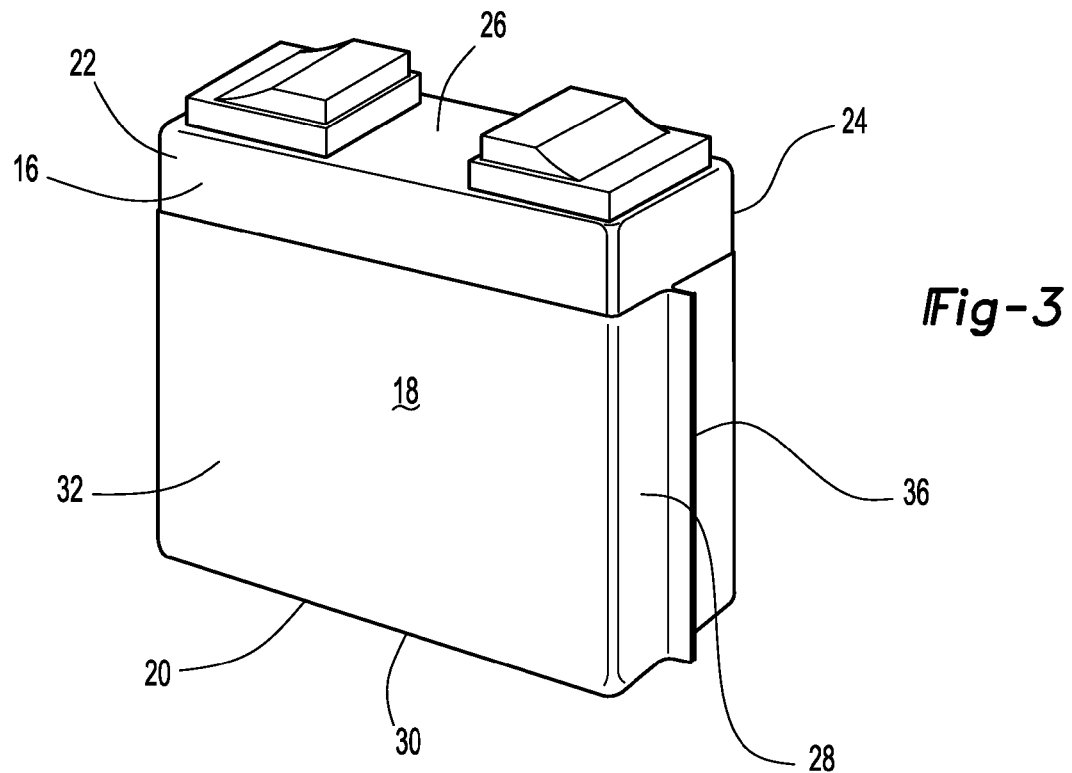
FIG. 3 is a perspective view of a battery cell encased in a jacket.

Referring to FIG. 3, a cell 16 is shown encased in a dielectric jacket or pouch 18. The jacket may be thermally conductive. The cell 16 has a bottom 20, a front 22, a back 24, a top 26 and two side portions 28. The jacket 18 has a seamless bottom panel 30, a seamless front panel 32 and a seamless back panel 34. The jacket has two seams 36 on opposing side portions 28 of the cell 16. The seams 36 connect the jacket panels to form a continuous jacket around five sides of the cell 16.

Figure 4:
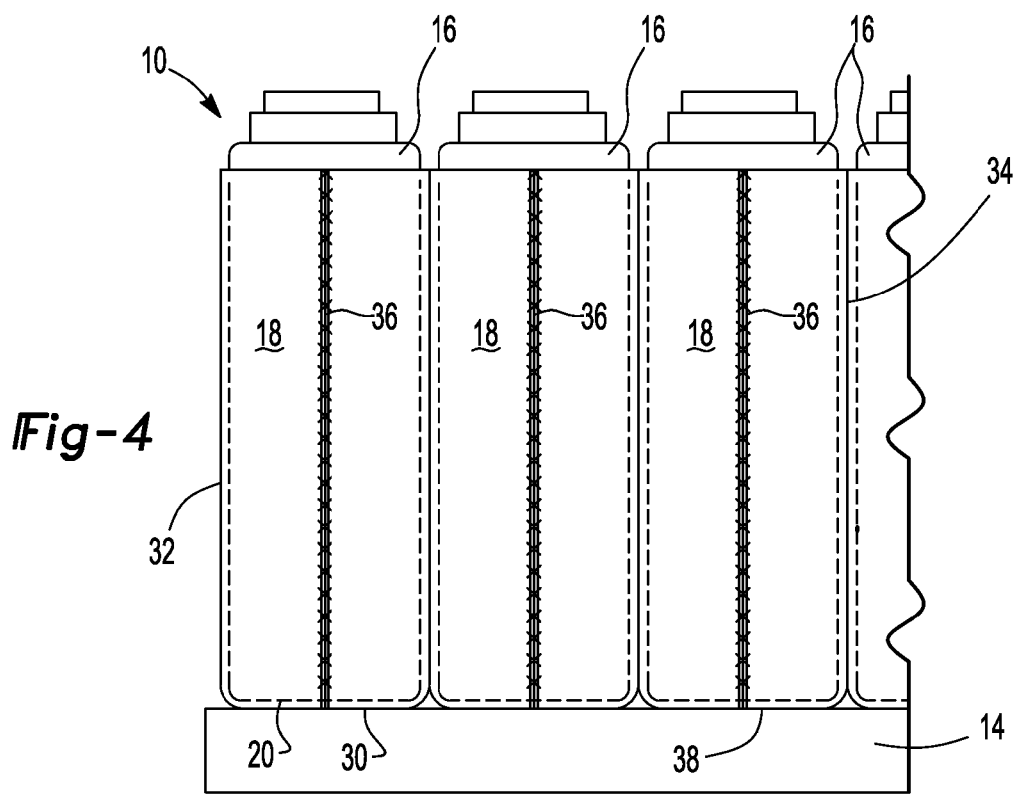
FIG. 4 is a side view of a section of a battery array.

Referring to FIG. 4, a cutout view is shown of the battery assembly. The battery assembly 10 comprises a cold plate 14 having a plurality of cells 16 disposed on the cold plate 14. The cells 16 are encased in a protective jacket 18 to prevent electrical discharge between the cell 16 and the cold plate 14 along interface 38. Each jacket 18 has a seamless bottom panel 30 to provide increased contact and a better fit between the cell bottom 20 and the cold plate 14. The jackets 18 also prevent electrical discharge between adjacent cells. Each jacket 18 has a seamless front panel 32 and a seamless back panel 34. The seamless front and back panels provide better packaging of the cells 16 in the battery array 12. Seams along adjacent cell interfaces can cause uneven forces along the front and back of the cells which may reduce cell life and create packaging issues.

The jackets 18 may also provide a smoother interface between adjacent cells, which may provide a better distribution of compressive loads. The jacket, while being thin, does have a wall thickness that can absorb surface irregularities on the cell can outer surface. For example, some cell designs have a weld seam where the can top is attached. The weld seam may at least partially sink into the jacket 18 and provide a less pronounced irregularity.

Figure 5:
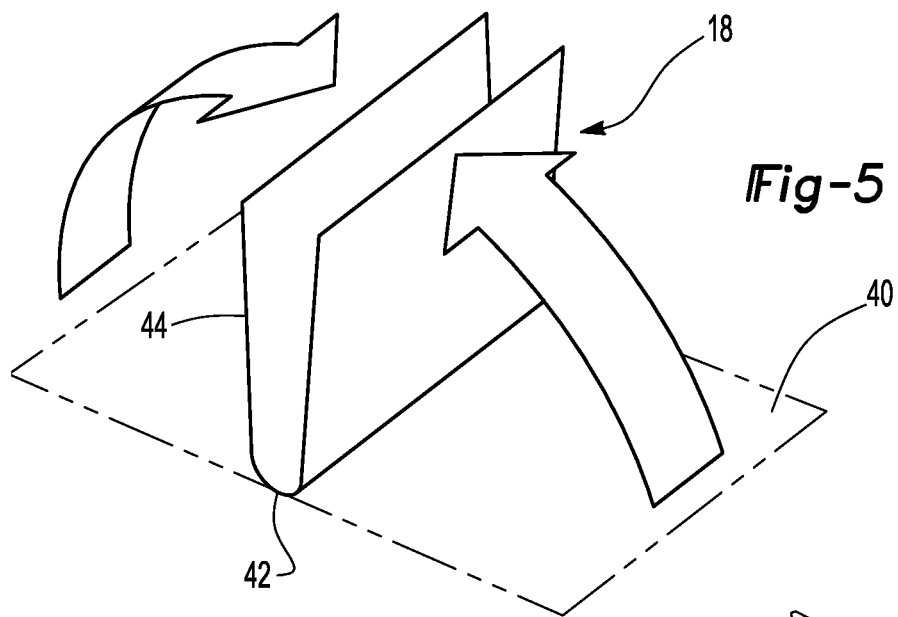
FIG. 5 is a perspective view of a jacket formation process.
Figure 6:
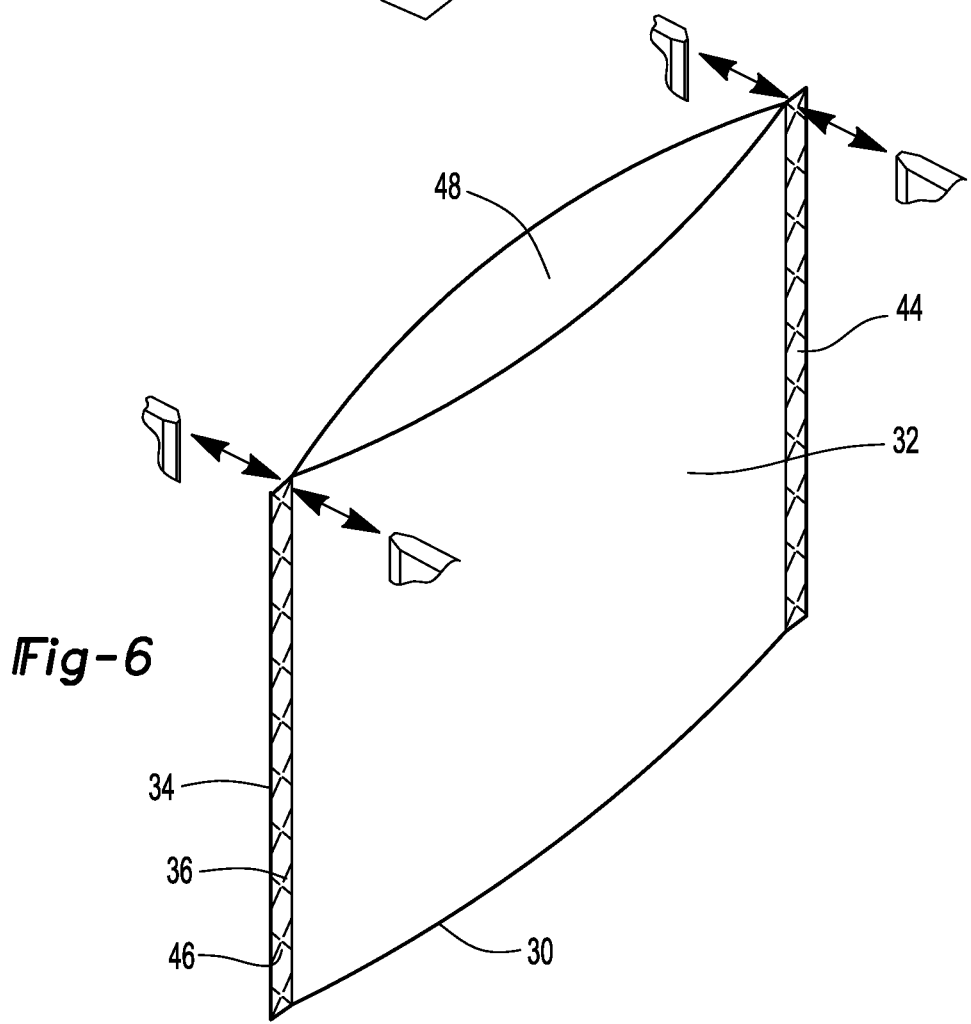
FIG. 6 is perspective view of a fully constructed jacket.
Figure 10:
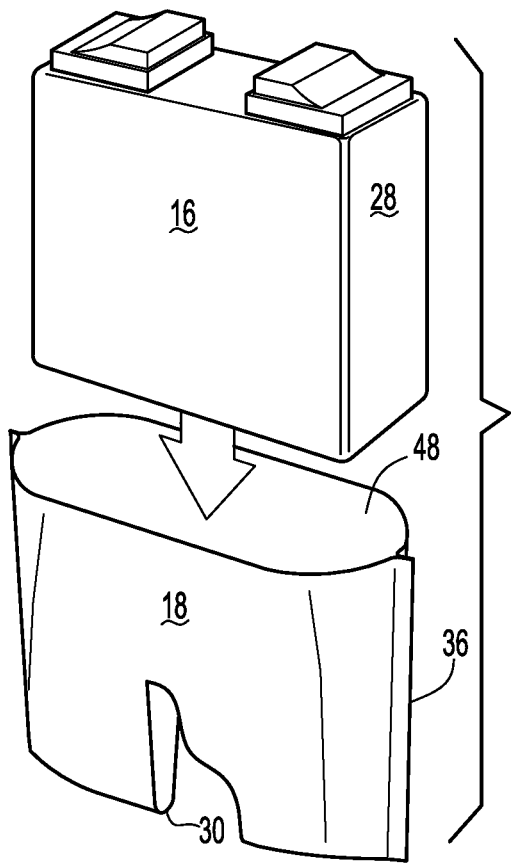
FIG. 10 is a perspective view of a cell being received within a jacket.

Referring to FIGS. 5 and 6, the construction of the jacket or pouch 18 is now described in detail. The pouch 18 may be formed of a single unitary sheet 40. The sheet 40 is first folded in half along fold line 42. The sheet side edges 44 are then connected by a weld 46, or other conventional means, to form a pouch 18 having an open cavity 48. The pouch 18 has opposing side seams 36, a seamless bottom 30, a seamless front panel 32 and a seamless back panel 34. The pouch 18 and open cavity 48 are sized and shaped to receive a single cell 16 therein.

The jacket or pouch 18 is formed of a heat activated material that shrinks upon exposure to a heat source. The material may be polyethylene (PE), polypropylene (PP), polyethylene terephthalate (PET), polyvinyl chloride (PVC) or polytetrafluoroethylene (PTFF).

Referring to FIGS. 7, 8, 9 and 10, a cell 16 is received within the cavity 48 of the pouch 18. The cell 16 is positioned inside the pouch 18 such that the seams 36 of the pouch 18 are aligned with the side portions 28 of the cell 16. A cell side portion 28 and a corresponding seam 36 define a channel 50 extending along an inner seam edge from the pouch bottom 30 to the pouch top 52. The channel 50 provides an avenue for the trapped air 54 to escape the cavity 48 as the cell 16 is placed into the pouch 18. The cell 16 and pouch 18 may be placed on a support 56 such that the pouch is disposed between the cell bottom 20 and the support 56. The cell 16 may then be pressed against the support 56 to expel the air trapped between the cell bottom 20 and the bottom panel 30 out of the pouch 18 via the channel 50.

FIG. 8 illustrates a cell 16 completely received within the jacket 18. The jacket 18 may fully encase five sides of the cell 16 leaving the cell top 26 uncovered. Alternatively, the jacket 18 may not fully receive the cell 16, leaving an upper portion of the cell uncovered. The jacket 18 could also extend beyond to the top 26 of the cell 16.

A heat treatment may be applied to the pouch 18 after the cell 16 is fully received within the pouch 18. The heat treatment activates the shrink wrap material of the pouch 18 and causes the pouch 18 to shrink around the cell 16 forming a tight fitting encasement. Any conventional heat treating process may be used, such as an oven, shrink tunnel or heat gun. This disclosure contemplates employing additional methods of drawing the pouch 18 tightly against the 16. For example, a tight fit may be achieved by taping or gluing the pouch 18.

FIGS. 7 to 10 illustrate the cell being received within a previously formed pouch. However, rather than the cell being received with a fully formed pouch, the pouch could be formed around the cell. In this embodiment a cell would be placed on the sheet 40. The sheet 40 would then be folded around the front 22 and back 24 of the cell 16. After folding, the sheet side edges 44 could be welded together forming the seams 36. A heat treatment could then be applied to shrink wrap the pouch around the cell. Alternatively, another technique, such as gluing and/or taping could be used to tightly secure the pouch 18 to the cell 16.

Referring back to FIG. 3, the cell 16 and jacket 18 are shown post drawing. After drawing, the jacket 18 fits tightly up against the cell bottom 20 forming a seamless bottom panel 30 over the cell bottom 20. The front and back sides of the jacket 18 also fit tightly against the cell 16 and form seamless front 32 and back 34 panels over the front 22 and back 24 of the cell 16. The side seams 36 are drawn tightly up against the cell side portions 28 to collapse the channel 50. The channel 50 may or may not become fully collapsed after drawing. The tight fitting jacket 18 helps to prevent unwanted moisture and other undesirables from contacting the cell 16.

Figure 11:
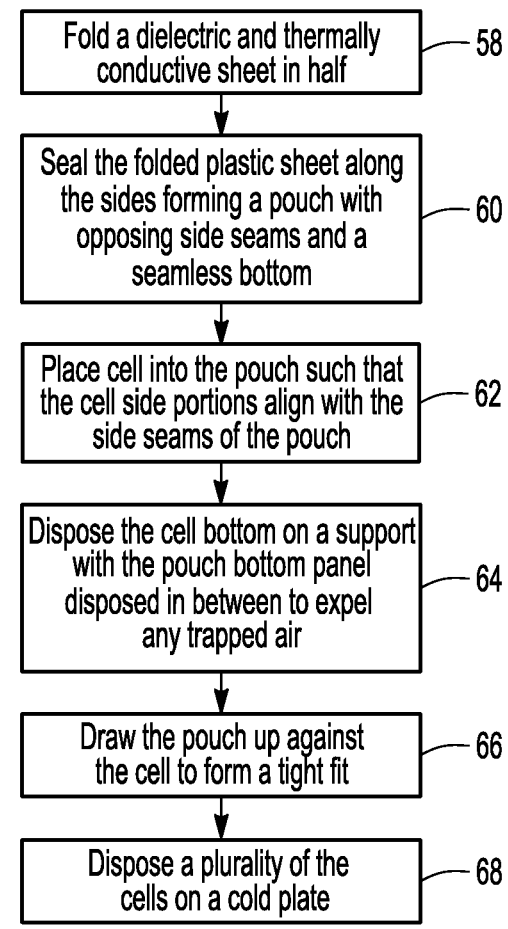
FIG. 11 is a flow chart of the method disclosed by the present application.

FIG. 11 illustrates a flow chart of the assembly steps for the disclosed method. At step 58, a unitary and dielectric sheet is folded in half. The sheet material, in this example, is a heat activated material such as shrink wrap plastic. The folded sheet at step 60 is then sealed along the sides forming a pouch or jacket with opposing side seams and a seamless bottom. At step 62, the battery cell is received into the fully assembled pouch such that the cell side portions align with the side seams of the pouch. The received cell bottom at step 64 is disposed on a support with the pouch bottom panel disposed in between to expel any trapped air from the pouch. At step 66, the pouch is drawn up against the cell to form a tight fit between jacket and the cell. At this point, the cells are fully assembled. At step 68, a plurality of cells are disposed on a cold plate.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A battery assembly comprising:
a cold plate; and
prismatic battery cells each including a housing having opposing sides and a bottom supported on the cold plate, the housing of each cell being surrounded by a dielectric jacket having a seam on each of the opposing sides and a seamless panel disposed between the cold plate and the bottom such that the seamless panel provides a seamless interface between the cold plate and the bottom.

2. The battery assembly of claim 1 wherein the housing of each of the cells further comprises:
a front and back also surrounded by the jacket such that the jacket forms a continuous, uninterrupted and seamless panel over the front and back of each housing.

3. The battery assembly of claim 1 wherein the jacket is formed of a single unitary plastic sheet.

4. The battery assembly of claim 1 wherein the jacket is made of a shrink wrap material.

5. The battery assembly of claim 1 wherein the jacket is made of a thermally conductive material.

6. A battery assembly comprising:
a plurality of prismatic battery cells arranged in an array, each of the cells including a housing having a bottom in contact with a surface and encased in a dielectric jacket surrounding side portions and the bottom of the housing, each of the jackets having seams on opposing side portions of a corresponding housing but not on the bottom of the corresponding housing such that the jacket forms a continuous and uninterrupted panel over the bottom to provide a seamless interface between the bottom and the surface.

7. The battery assembly of claim 6 wherein the surface is a panel of a cold plate.

8. The battery assembly of claim 6 wherein the housing of each of the cells further comprises:
a front and back also encased in the jacket such that the jacket forms a continuous, uninterrupted and seamless panel over the front and back of each housing.

9. The battery assembly of claim 6 wherein each of the jackets is made of a thermally conductive material.

10. The battery assembly of claim 6 wherein each of the jackets is formed of a single unitary plastic sheet.

11. The battery assembly of claim 6 wherein each of the jackets is made of a shrink wrap plastic material.

12. The battery assembly of claim 6 wherein each of the cells has six sides.

* * * * *